United States Patent [19]

Mietzel et al.

[11] Patent Number: 4,807,645

[45] Date of Patent: Feb. 28, 1989

[54] HUSKING ROLL SECTION

[75] Inventors: Dennis O. Mietzel; Aaron L. Strand, both of Columbus, Wis.

[73] Assignee: Hughes Company, Inc., Columbus, Wis.

[21] Appl. No.: 62,950

[22] Filed: Jun. 16, 1987

[51] Int. Cl.⁴ ............................................. A01F 7/00
[52] U.S. Cl. ..................................... 130/5 J; 56/110
[58] Field of Search ............... 130/5 R, 5 B, 5 J, 5 G; 56/104, 110

[56] References Cited

U.S. PATENT DOCUMENTS

| | | |
|---|---|---|
| 106,276 | 8/1870 | Philip . |
| 135,840 | 2/1873 | Philip . |
| 135,841 | 2/1873 | Philip . |
| 856,828 | 6/1907 | Wilson et al. . |
| 902,729 | 11/1908 | Hibbs . |
| 2,178,013 | 10/1939 | Blank . |
| 2,180,594 | 11/1939 | Kuhlman . |
| 2,239,899 | 4/1941 | Nightenhelser et al. . |
| 2,418,700 | 4/1947 | Davies . |
| 2,489,495 | 11/1949 | Morral et al. . |
| 2,535,485 | 12/1950 | Cover . |
| 2,569,175 | 9/1951 | Karlsson . |
| 2,576,292 | 11/1951 | Flora . |
| 2,589,841 | 3/1952 | Miller . |
| 2,594,995 | 4/1952 | Richmond ............................ 130/5 J |
| 2,610,634 | 9/1952 | Beck et al. . |
| 2,704,078 | 3/1955 | Scranton . |
| 2,737,185 | 3/1956 | Siemen ................................. 130/5 J |
| 2,751,743 | 6/1956 | Bauer . |
| 2,821,058 | 1/1958 | Jones . |
| 2,905,181 | 9/1959 | Nelson . |
| 2,927,616 | 3/1950 | Bruner . |
| 3,001,527 | 9/1961 | Jones . |
| 3,101,720 | 8/1963 | Karlsson . |
| 3,103,240 | 9/1963 | Minera . |
| 3,113,574 | 12/1963 | Greedy et al. . |
| 3,241,216 | 3/1966 | Wellendorf . |
| 3,900,036 | 8/1975 | Anderson et al. . |
| 4,278,097 | 7/1981 | Anderson et al. ................... 130/5 D |
| 4,625,735 | 12/1986 | Anderson et al. ................... 130/5 G |

OTHER PUBLICATIONS

Stanfield, Zenas A., *A Seed Corn Harvest Alternative* (Nov. 1985).

New Idea Farm Equipment Corporation Brochure; Showing Model 736 Seed Corn Husking Unit as well as pp. 4, 12, and 22 from brochure, no publication date given.

*Primary Examiner*—Stephen F. Husar
*Attorney, Agent, or Firm*—Lathrop & Clark

[57] ABSTRACT

A husking roll section for use in combination with a second parallel husking roll section within a husking machine, includes a hollow core with an outside surface, and a husking sleeve affixed to and surrounding the outside surface of the core to form a husking surface. The sleeve includes at least one hardened sector comprising a rigid rib, and a resilient major portion which is formed from an elastic material and which is bonded to the rigid rib and core. The husking sleeve presents a plurality of helical lands and grooves. When the rigid rib is a metal rib which is affixed to the core outside surface, the elastic material which forms the resilient major portion is bonded to the rigid metal rib sides and to the core outside surface so that the rigid rib sides are completely covered by the elastic material, and the metal rib and the elastic material immediately adjacent thereto form the hardened sector. The hardened sector instead may be formed from a hardened rubber rib which is bonded to the resilient major portion.

19 Claims, 8 Drawing Sheets

HUSKING ROLL SECTION

BACKGROUND OF THE INVENTION

1. Field of the Invention.

The present invention relates to machines for husking corn, and in particular to husking roll sections which may be used for husking sweet corn and seed corn.

2. Description of the Prior Art.

When husking any kind of corn, several goals should be achieved. First, the husks should be removed from a high percentage of the ears of corn. Second, any attached stalks also should be removed from the ears. Third, the shelling of kernels of corn from the cobs should be kept to a minimum. Seed corn is generally harvested when it is relatively dry, and therefore it tends to shell more easily than sweet corn, which is supple. Reducing shelling to a minimum with seed corn is particularly important, because seed corn is a relatively expensive commodity. Another important goal in husking seed corn is maintaining a high rate of germination. Sometimes the rough action of removing the husks from an ear can scrape or otherwise damage the individual kernels of seed corn, thereby greatly increasing the danger that they will not germinate.

The prior art is generally cognizant of various types of rolls which are used in stripping and husking corn and destemming other articles of produce. Sweet corn is generally picked in the field without the husks being removed. After picking, the ears of corn are then taken to a plant where they are placed in a corn husker which husks the corn and removes any attached stalks, hopefully with little damage to the tender kernels. On the other hand, seed corn often has been husked using a two-step system. The seed corn is husked once on the picker, and then husked a second time at a station. More recently, however, it has been found that seed corn can be husked more efficiently using a one-step husking procedure, whereby the seed corn is first husked at the station in a corn husking machine.

Metal rolls have been used in corn harvesters which both pick and husk the corn, and also in corn huskers. Rubber rolls also have been used in both types of machines. Metal rolls tend to remove husks less aggressively than rubber rolls, and therefore, cause lower shelling losses of kernels. However, the use of metal rolls alone often leaves too many ears which have not been husked completely. Longitudinal blades or ribs have been used on metal rolls to cut and eject stalks away from the ears being husked. This type of longitudinal blade is shown in U.S. Pat. No. 135,841 to Philip, U.S. Pat. No. 2,489,495 to Morral et al., U.S. Pat. No. 2,905,181 to Nelson, and U.S. Pat. No. 4,625,735 to Anderson et al. These longitudinal blades have exposed sharp edges which may cause damage to the kernels.

To obtain a more aggressive removal of husks from ears of corn, rolls formed from resilient materials such as rubber are often used. Aggressive rubber rolls are generally quite beneficial for use in husking ears of sweet corn, since the kernels are supple and therefore resistant to shelling. However, such rubber rolls, especially those having standard high-profile lands and grooves, can be too aggressive for husking seed corn. The dry, brittle kernels in seed corn are easily agitated loose by the aggressive action of such rubber rolls. This aggressive action also often causes damage to the individual seed kernels, thereby reducing their chances of germination.

Another problem may occur when two cooperating counter-rotating rubber rolls are used to husk corn. Sometimes a connected corn stalk will get caught between the two rubber rolls causing the stalk to move into an upright position. The rubber rolls are often unable to break the stalk off from the ear, so the stalk remains wedged between the two rubber rolls. Since the rolls are made from rubber, as the rolls rotate, an annular groove may form in the rolls where the stalk is caught. Such a groove reduces the effectiveness of the rolls, which must then be replaced at substantial cost and loss of time. This can particularly be a problem with seed corn, which usually has a large number of stalks attached to the ears to be husked.

The use of rubber husking roll sections having lands and grooves therebetween is old in the art, and is shown, for example, in U.S. Pat. No. 3,113,574 to Greedy et al. and U.S. Pat. No. 2,535,485 to Cover, the disclosures of which are hereby incorporated by reference. Cover and Anderson, et al. disclose using resilient husking roll sections interposed on a shaft between non-resilient companion elements.

SUMMARY OF THE INVENTION

The present invention is summarized in that a husking roll section for use in combination with a second parallel husking roll section within a husking machine, includes a hollow core with an outside surface, and a husking sleeve affixed to and surrounding the outside surface of the core to form a husking surface. The husking surface has parallel helical lands and grooves adapted to mesh with similar grooves and lands of reverse orientation on the second husking roll when the two husking rolls are rotated in opposite directions. The husking sleeve includes at least one rigid helical metal rib which has two sides and which is affixed to the core outside surface so as to be parallel with the lands and grooves, and a resilient major portion formed from an elastic material which is bonded to the rigid rib sides and to the core outside surface so that the rigid rib sides are completely covered by the elastic material. The metal rib and the elastic material immediately adjacent thereto form a hardened sector for engaging a produce stalk between the parallel meshing husking roll sections without substantial deformation of the hardened sector to force the stalk to pass between the roll sections and be ejected thereby.

In another embodiment, the husking roll section includes a hollow core with an outside surface, and a husking sleeve affixed to and surrounding the outside surface of the core to form a husking surface having lands and grooves which may or may not mesh with the grooves and lands of the second roll section. The sleeve includes at least one hardened sector which is formed entirely from a hardened rubber rigid rib which has two sides, and a resilient major portion which is formed from the elastic material which surrounds and is bonded to the outside surface of the core and to the two sides of the rigid rib.

It is a primary object of the invention to provide a resilient husking roll section with a hardened sector which pinches and pulls stalks off from the ears of corn which are being husked.

It is a second object of the invention to provide a husking roll section having a hardened sector which effectively separates stalks from the ears of corn being husked, without any exposed sharp edges or sharp corners which could damage the kernels, and with a minimum of shelling.

Another object of the invention is to provide a husking roll section having a hardened sector for effectively removing stalks, where the hardened sector along its entire length can directly abut against grooves or lands on the adjacent parallel cooperating husking roll section.

An additional object of the invention is to provide a husking roll section without sharp edges or sharp corners, but which nevertheless prevents stalks from being retained between the elastic husking surfaces of two cooperating roll sections, thereby eliminating the possibility of such stalks forming annular grooves in the elastic husking surfaces of the two cooperating sections.

A further object of the invention is to provide an intermeshing type of husking roll section having a hardened sector for separating stalks, yet which still is able to mesh with other intermeshing sections.

Yet another object of the invention is to provide a husking roll section which husks seed corn and ejects stalks with a minimum of damage to the individual seed kernels, thereby maximizing the possibility of germination.

Yet an additional object of the invention is to provide husking roll sections which are both inexpensive to manufacture, and are also easy to use.

Other objects, features, and advantages of the invention will be apparent from the following detailed description taken in conjunction with the accompanying drawings wherein preferred embodiments of the invention have been selected for exemplification.

DESCRIPTION OF THE PREFERRED EMBODIMENTS

Figure 1:
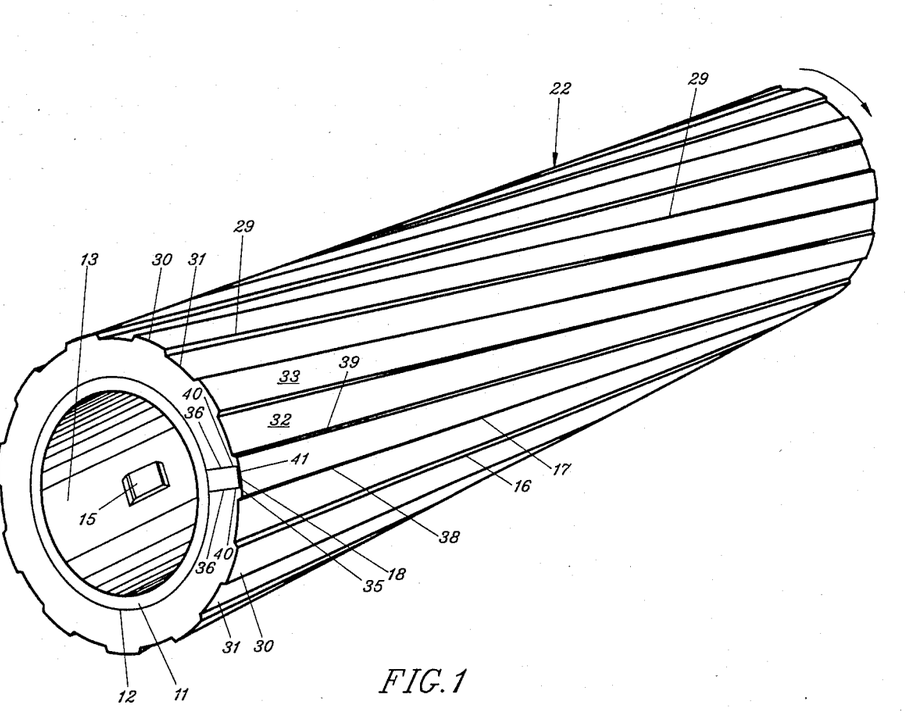
FIG. 1 is a perspective view of a husking roll section in accordance with the invention having low-profile elevations and a hardened sector formed by an embedded steel rigid rib.

Referring more particularly to the drawings, wherein like numbers refer to like parts, FIG. 1 shows a preferred husking roll section 22 having a hollow core 11 with an outside surface 12 and an inside surface 13 having three keys 15 (two keys are not shown), which are adapted to fit into a keyway in a shaft (not shown) on which the roll section will be entrained. The husking roll section 22 further includes a husking sleeve 16 affixed to and surrounding the outside surface 12 of the core 11 to form a husking surface 17. The husking sleeve 16 has a hardened sector 18, and a resilient major portion 29 which is formed from an elastic material and is bonded to the hardened sector 18 and the core 11. The low-profile sleeve husking surface 17 shown in FIG. 1 defines eleven parallel helical lands 30 and eleven grooves 31 therebetween which extend the entire length of the roll section 22. The term "low-profile" is used herein to apply to intermeshing husking roll sections, husking sleeves, husking surfaces, or lands and grooves, wherein the radial distance from the bottoms of the grooves to the tops of the lands is less than approximately 0.075 inches. On intermeshing husking roll sections, the lands and grooves each advance preferably less than one 360° turn for each nominal twelve inch roll section. In the preferred husking roll section 22 the radial distance from the bottoms 32 of the grooves 31 to the tops 33 of the lands 30 may be about 0.047 inches. The rigid steel rib 35 has two sides 36 and a top 41 which are surrounded by and bonded to the elastic material which forms the resilient major portion 29 of the sleeve 16. The hardened sector 18 is formed by a rigid helical steel rib 35 which is welded to the outside surface 12 of the core 11, and the elastic material which is immediately adjacent to the rib 35. This hardened sector 18 functions to eject stalks and to separate the ears from the stalks. The helical lands 30 and grooves 31 each advance two-elevenths of a turn as they extend along the entire nominal twelve inch length of the roll section 22 shown in FIG. 1. The steel rib 35 shown in FIG. 1 is radially aligned with a land 30 to form the hardened sector 18 which follows the entire length of a land 30. The land 30 has sloped edges 38 and 39 which form buffer strips that entirely cover the upper portions 40 of the sides 36 of the rigid steel rib 35, and the land may further extend across the top surface of the rib 35, as shown. The hardened sector 18 comprises the entire land 30 and underlying rigid steel rib 35, the rib 35 effectively serving to stiffen or harden the overlying land 30 and substantially reducing the resilience of the sleeve 16 at the hardened sector 18. The "upper portions" of the sides of a steel rib are defined herein as those portions of the steel rib sides which are located in a land. The buffer strips eliminate sharp corners or edges which might otherwise damage the produce. Since the hardened sector 18 conforms to a land 30, the hardened sector does not alter the husking surface 17 in any fashion which would prevent the section 22 from being able to intermesh with another roll section.

Figure 2:
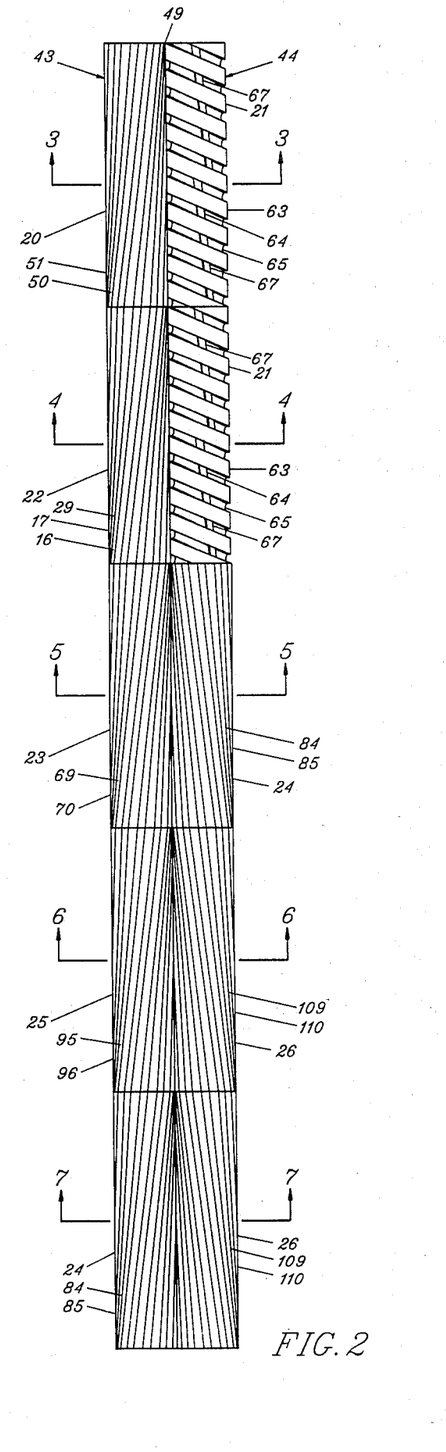
FIG. 2 is a top plan view of two cooperating counter-rotating husking roll assemblies, the left roll assembly having five husking roll sections which are embodiments of the present invention, and the right roll assembly having three husking roll sections which are embodiments of the present invention.

FIG. 2 shows two cooperating counter-rotating roll assemblies 43 and 44, each of which is comprised of five roll sections. FIGS. 3-7 are cross-sectional views of each of the five pairs of cooperating counter-rotating roll sections illustrated in FIG. 2. The roll assemblies 43 and 44 shown in FIGS. 2-7 are comprised of various different types of roll sections, several of which are preferred embodiments of the present invention. The roll assemblies 43 and 44 shown in FIGS. 2-7 are not intended to be representative of a preferred total combination of roll sections which would actually be used in a husking machine, but are selected primarily to disclose various embodiments of the present invention. FIGS. 8-11 show a representation of one combination of husking roll sections which would typically be used in a husking machine to husk seed corn. The particular rotational placement shown for the keys 15 in FIGS. 1, 3-7, 9-11, and 13-14 is not pertinent to this disclosure. In fact, the key 15 would have to be located differently than shown in the figures in order to fit into the same shaft keyway.

Figure 3:
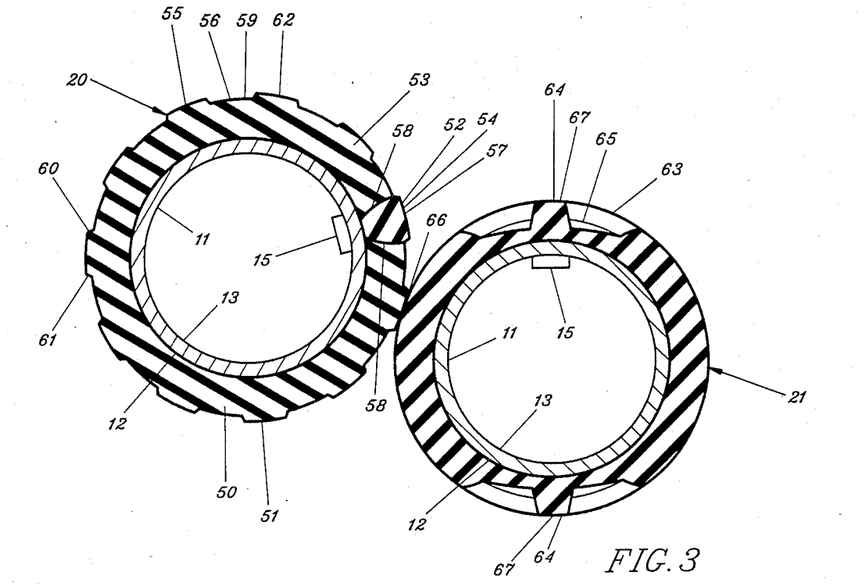
FIG. 3 is a section view taken along section line 3—3 of FIG. 2.

FIG. 3 shows two roll sections 20 and 21 which are closest to the feed end 49 of the two cooperating roll assemblies 43 and 44. The left-most roll section 20 includes a cylindrical core 11 with an outside surface 12 and an inside surface 13 having three keys 15 adapted to fit into a keyway in the shaft on which the roll sections are entrained. The roll section 20 furthermore includes a husking sleeve 50 which is affixed to and surrounds the outside surface 12 of the core 11 to form a low-profile husking surface 51. The sleeve 50 includes a hardened sector 52 which is formed entirely from a hardened rubber rib 54, and a resilient major portion 53 which is formed from an elastic material and which is bonded to the hardened sector 52 and core 11. The term "hardened" or "hard" when used herein to apply to rubber, defines rubber which has a hardness on the Shore hardness scale of from D55 to D75. The Shore hardness scale is commonly used with convenient spring-loaded "pocket" hardness durometers. Since the hardened sector 52 is confined to the configuration of the lands 55 and grooves 56, the roll section 20 will be able to mesh with other similar intermeshing sectors. The sleeve 50 defines eleven parallel helical lands 55 and eleven grooves 56 therebetween which extend the entire nominal twelve inch length of the roll section 20. In the husking roll section 20 the radial distance from the bottoms 59 of the grooves 56 to the tops 62 of the lands 55 is preferably about 0.047 inches. The hard rubber hardened sector 52 also is helical and extends the entire length of the roll section 20, so that it is radially aligned with a land 55 and is in parallel relationship to the lands 55 and grooves 56. The hard rubber sector 52 includes a crown portion 57 which forms a land 55 on the husking surface 51. Each land, including that formed by the hardened rubber sector 52, has a leading edge 60 and a trailing edge 61. The hardened sector 52 is bonded to the core 11 and to the resilient major portion 53 along the sides 58 of the hard rubber sector 52. Alternatively the hardened rubber rib 54 might not extend all the way to the core 11, and might be bonded only to the resilient major portion 53. In such an embodiment, a small layer of the elastic material forming the resilient major portion 53 might extend between the rib 54 and core 11. The hardened rubber rib 54 would then be held in place solely by the resilient major portion 53.

The roll section 21 shown in FIG. 3 is a hardened rubber non-intermeshing spiral section having lands 63 which form two helicies, each of which advances five 360° turns in a nominal twelve inch husking spiral section 21. Bridge portions 64 span the grooves 65 between the lands 63 and are arranged in the form of two ribs 67 each of which extends half of the length of the spiral section 21. These ribs 67 have a pitch which is the same as that of the lands 55 and grooves 56 of counter-rotating roll section 20 but in the opposite direction, so that the ribs 67 come together with and press against the lands 55 or grooves 56 of roll section 20. These bridge portions 64 function to separate stalks from ears of corn and eject these stalks down through the pinch point where the cooperating husking rolls 20 and 21 abut one another at 66. Hard rubber spiral husking sections typically are to be used near the feed end 49 of the lower 44 of two husking roll assemblies 43 and 44, and are not to be considered as part of the present invention. Other non-resilient spiral sections such as the aluminum spiral sections 119 shown in FIGS. 8 and 9 typically may also be used near the feed end 125 of the roll assemblies 46 and 47 to provide for a gentle initial husking action on the ears of corn. We have found it beneficial to place non-resilient spiral sections at the feed end of roll assemblies to remove husks that are easily removable with minimum aggressiveness to the kernels of the ears which they husk.

As the husking sections 20 and 21 of FIG. 3 counter-rotate against each other, they remove husks from passing ears of corn. As the hardened sector 52 of section 20 rotates to the pinch point 66, it presses any stalks caught between the two sections against the lands 63 of section 21. Since the hardened sector 52 is relatively incompressible, the stalk is pinched and pulled away from the ear, and then ejected downwardly. Since the hardened sector 52 has no sharp corners or sharp edges, it is able to eject the stalk without cutting the stalk and without slicing or otherwise causing damage to the kernels of corn. Stalks are also ejected similarly when the bridge portions 64 f section 21 rotate to the pinch point 66.

Figure 4:
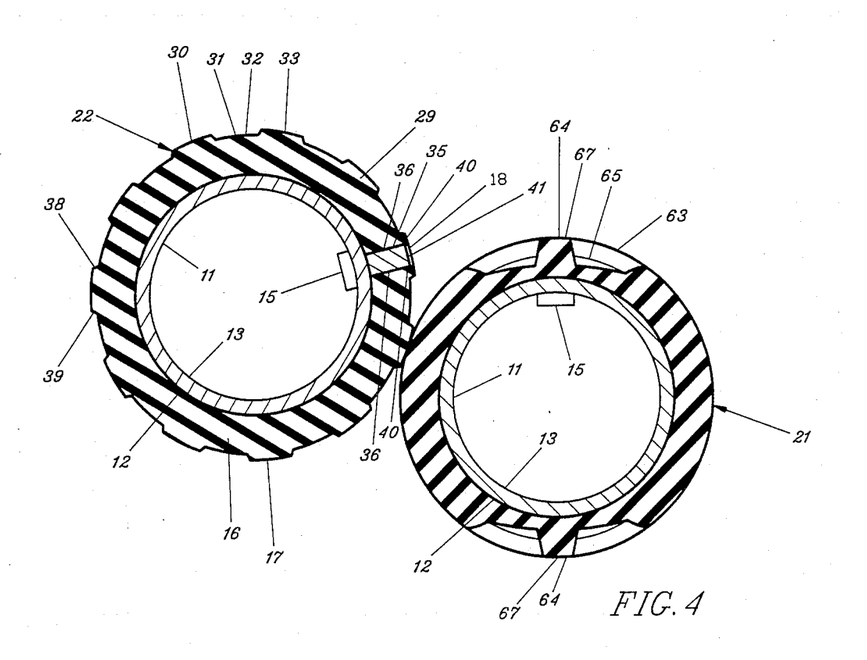
FIG. 4 is a section view taken along section line 4—4 of FIG. 2.

FIG. 4 is a cross-sectional view of two husking rolls 22 and 21 which are second nearest to the feed end 49 of the husking roll assemblies 43 and 44. Husking roll section 22 is substantially identical to that shown in FIG. 1, and has a husking sleeve 16 which forms a low-profile husking surface 17 with a hardened sector 18 formed by a rigid helical steel rib 35 and the elastic material which is immediately adjacent to the steel rib 35. The spiral husking roll section 21 is identical to that shown in FIG. 3. These roll sections 22 and 21 of FIG. 4 act together to remove husks and stalks in a manner similar to sections 20 and 21 of FIG. 3. The sloped edges 38 and 39 of the hardened sector 18 on section 22 form buffer strips which entirely cover the upper portions 40 of the sides 36 of the rigid steel rib 35. Thus the stalks are pinched and pulled away from the ears of corn, instead of being cut. As the hardened sector 18 becomes worn, the steel rib 35 and buffer strips formed by the sloped edges 38 and 39 tend to wear away at about the same rate, so that the strips continue to buffer the rib 35.

Figure 5:
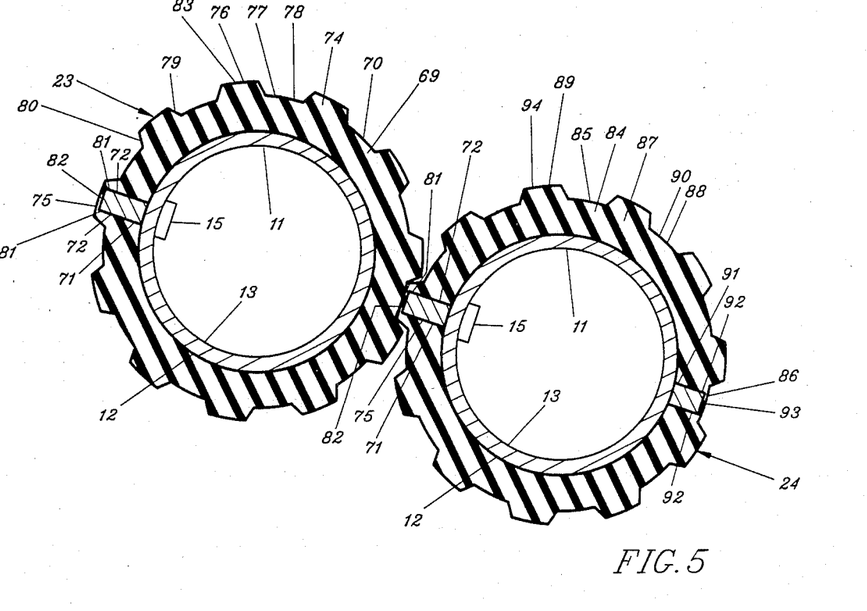
FIG. 5 is a section view taken along section line 5—5 of FIG. 2.
Figure 6:
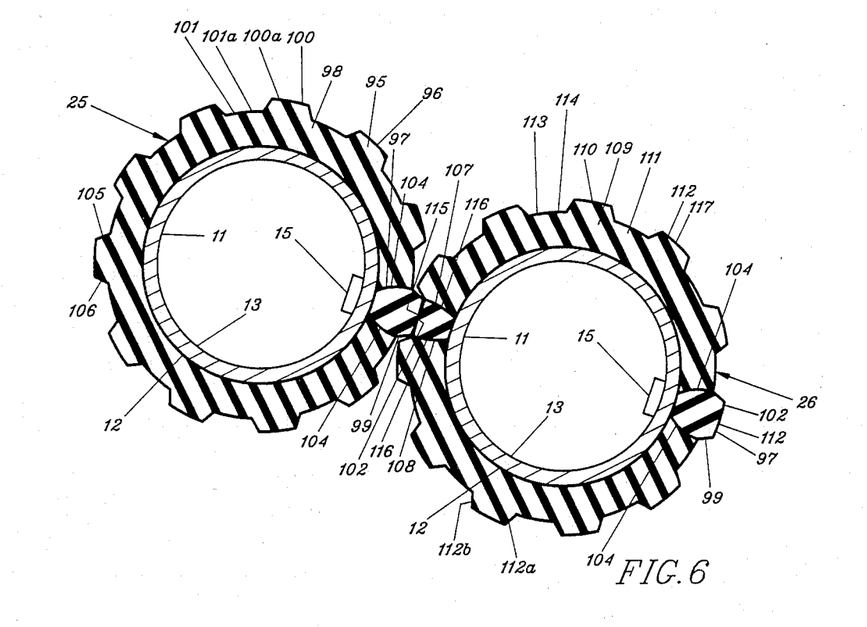
FIG. 6 is a section view taken along section line 6—6 of FIG. 2.
Figure 7:
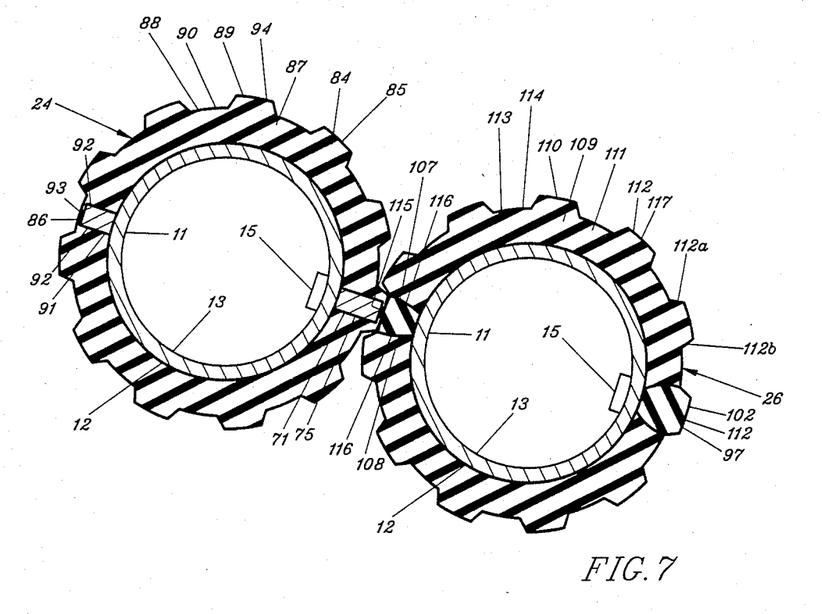
FIG. 7 is a section view taken along section line 7—7 of FIG. 2.

FIGS. 5-7 show husking roll section 23-26, which have husking sleeves which form high-profile husking surfaces. The term "high-profile" is used herein to apply to intermeshing husking roll sections, husking sleeves, husking surfaces, or lands and grooves, wherein the radial distance from the bottoms of the grooves to the tops of the lands is approximately 0.075 inches and greater. High-profile husking sections are relatively aggressive in their husking action, and therefore are preferably not used to husk seed corn. The left-most husking roll 23 of FIG. 5 includes a hollow core 11 with an outside surface 12 and an inside surface 13 having three keys 15 adapted to fit into a keyway in the shaft on which the roll sections are entrained. The husking roll section 23 furthermore includes a husking sleeve 69 which is affixed to and surrounds the outside surface 12 of the core 11 to form a high-profile husking surface 70. The sleeve 69 includes one rigid steel rib 71 with two sides 72 which are welded to the outside surface 12 of the core 11, and a resilient major portion 74 which is formed from elastic material and surrounds and is bonded to the outside surface 12 of the core 11 and the two sides 72 of the rigid rib 71. In this particular embodiment, the embedded rigid rib 71 is entirely covered on two sides 72 and a top 82 by and is bonded to the elastic material. The rigid rib 71 in combination with elastic material which is immediately adjacent to the rib 71 forms the hardened sector 75. The husking surface 70 of the sleeve 69 defines eleven parallel helical lands 76 and eleven parallel helical grooves 77 therebetween which extend the entire nominal twelve inch length of the roll section of 23. In the preferred high-profile husking roll section 23 the radial distance from the bottoms 78 of the grooves 77 to the tops 83 of the lands 76 is about 0.110 inches. The hardened sector 75 which is formed by the steel rib 71 and adjacent elastic material is radially aligned with a land 76 and extends the entire length of the roll section 23 in a parallel relationship to the lands 76 and grooves 77. The land 76 which includes the metal rib 71, has sloped edges 79 and 80 which form buffer strips that cover upper portions 81 of the two sides of the rigid steel rib 71.

The right-most, high-profile husking roll section 24 shown in FIG. 5 is similar to the husking roll section 23 except that it has two hardened sectors 75 and 86. The roll section 24 includes a husking sleeve 84 which is affixed to and surrounds the outside surface 12 of the core 11 to form a husking surface 85. In addition to the hardened sectors 75 and 86, the husking sleeve 84 includes a resilient major portion 87 which is formed from an elastic material which is bonded to the hardened sectors 75 and 86 and core 11. The sleeve husking surface 85 defines eleven parallel helical lands 89 and eleven parallel helical grooves 90 therebetween, which extend the entire nominal twelve inch length of the roll section. In the husking roll section 24 the distance from the bottoms 88 of the grooves 90 to the tops 94 of the lands 89 is about 0.110 inches, the same as in cooperating husking roll section 23. The two hardened sectors 75 and 86 are also helical and extend the entire length of the roll section in a parallel relationship to the lands 89 and grooves 90. The hardened sector 75 is radially aligned with a land 89 and is formed by a rigid helical steel rib 71 which is welded to the outside surface 12 of the core 11, and the elastic material which is immediately adjacent to the rib 71. The rib 71 has two sides 72 and a top 82 which are surrounded by and bonded to the elastic material forming the resilient major portion 87 of the sleeve 84. The land 89 in which the steel rib 71 is embedded has sloped edges 79 and 80 which form buffer strips that cover upper portions 81 of the sides 72 of the steel rib 71. The hardened sector 86 is radially aligned with a groove 90 and is formed by a rigid helical steel rib 91 which is welded to the outside surface 12 of the core 11, and the elastic material which is immediately adjacent to the rib 91. The rib 91 has two sides 92 and a top 93, which are surrounded by and bonded to the elastic material forming the resilient major portion 87 of the sleeve 84. The hardened sectors 75 and 86 are located 180° apart.

When the roll sections 23 and 24 counter-rotate 180°, the hardened sector 75 of section 23 will directly abut and press against the hardened sector 86 of section 24. Since the two hardened sectors press together to pinch and remove stalks caught between sections 23 and 24, stalk removal is relatively aggressive. Even though these sections 23 and 24 include steel ribs 71 and 91, the hardened sectors 75 and 86 have no hard, sharp edges or sharp corners which might cut or damage the produce. Again, each hardened sector 75 or 86 acts to pinch the stalks and pull them from the produce, and then to eject them. Note that the hardened sectors 75 and 86 do not alter the shape of the husking surfaces 70 and 85 of sections 23 and 24, with their lands and grooves. Despite the presence of the hardened sectors 75 and 86, roll sectors 23 and 24 are able to intermesh without a hardened sector or metal rib forming an impediment to the intermeshing.

The left-most husking roll section 25 shown in FIG. 6 is similar to the husking roll 20 shown in FIG. 3, except that husking roll 25 is high-profile. The roll section 25 includes a husking sleeve 95 which is affixed to and surrounds the outside surface 12 of the core 11 to form a husking surface 96. The sleeve 95 includes one hardened sector 97, and a resilient major portion 98 formed from an elastic material which is bonded to the hardened sector 97 and core 11. The sleeve husking surface 96 defines eleven parallel helical lands 100 and eleven parallel helical grooves 101 therebetween, which extend the entire nominal twelve inch length of the roll section 25. The hardened sector 97 is formed entirely by a hardened rubber rib 99 which is radially aligned with and forms a land 100. The hard rubber sector 97 is helical and extends the entire length of the roll section 25 in a parallel relationship to the lands 100 and grooves 101. In the preferred roll section 25, the radial distance from the bottoms 101a of the grooves 101 to the tops 100a of the lands 100 is preferably about 0.110 inches. The hard rubber sector 97 includes a crown portion 102 which forms a land 100 on the husking surface 96, and two sides 104 which are surrounded by and bonded to the elastic material which forms the resilient major portion 98. Each land 100 has a leading edge 105 and a trailing edge 106, both of which are sloped. Since the hardened rubber sector 97 forms a land, it also has sloped leading and trailing edges. The sloped edges help to eliminate sharp corners and edges. Although the hardened rubber rib 99 as shown is affixed to the core 11, the rib 99 instead might be affixed solely to the resilient major portion 98. In such am embodiment, some of the elastic material forming the resilient major portion 98 might extend between the rib 99 and the core 11.

The right-most, high-profile roll section 26 shown in FIG. 6 is similar to the husking roll section 25 except that it has two hardened sectors 97 and 108, both of which are formed from hardened rubber ribs 99 and 107. The roll section 26 furthermore includes a husking sleeve 109 which is affixed to and surrounds the outside surface 12 of the core 11 to form a husking surface 110. In addition to the hardened sectors 97 and 108, the husking sleeve 109 includes a resilient major portion 111 which is formed from an elastic material which is bonded to the hardened sectors 97 and 108 and the core 11. The sleeve husking surface 110 defines eleven parallel helical lands 112 and eleven parallel helical grooves 113 therebetween, which extend the entire nominal twelve inch length of the roll section 26. The distance between the bottoms 114 of the grooves 113 to the tops 117 of the lands 112 is preferably about 0.110 inches, the same as in meshing husking roll section 25. The two hardened sectors 97 and 108 are also helical and extend the entire length of the roll section 26 in a parallel relationship to the lands 112 and grooves 113. The hard rubber sector 97 is radially aligned with a land 112 and has a crown portion 102 which actually forms a land 112. The hard rubber sector 97 also has two sides 104 where it is surrounded by and bonded to the elastic material forming the resilient major portion 111 of the sleeve 109, and two sloped edges 112a and 112b which form a leading edge 112a and a trailing edge 112b. The hardened rubber sector 108 is radially aligned with a groove 113 and has a top surface 115 which forms the bottom 114 of a groove 113. The hardened rubber sector 108 also has two sides 116 which are surrounded by and bonded to the elastic material forming the resilient major portion 111 of the sleeve 109. The hardened sectors 97 and 108 are located 180° apart. The hardened rubber ribs 99 and 107 as shown are affixed to the core 11. Alternatively, they might not extend inwardly all the way to the core 11. In such an embodiment, the ribs 99 and 107 might be held in place solely by the resilient major portion 111.

FIG. 7 shows still another possible combination of husking roll sections, namely husking roll sections 24 and 26, identical to those already shown in FIGS. 5 and 6. The left-most husking roll section 24 of FIG. 7 is identical to the right-most husking roll section 24 of FIG. 5, and the right-most husking roll section 26 of Fig. 7 is identical to the right-most husking roll section 26 shown in FIG. 6.

Figure 8:
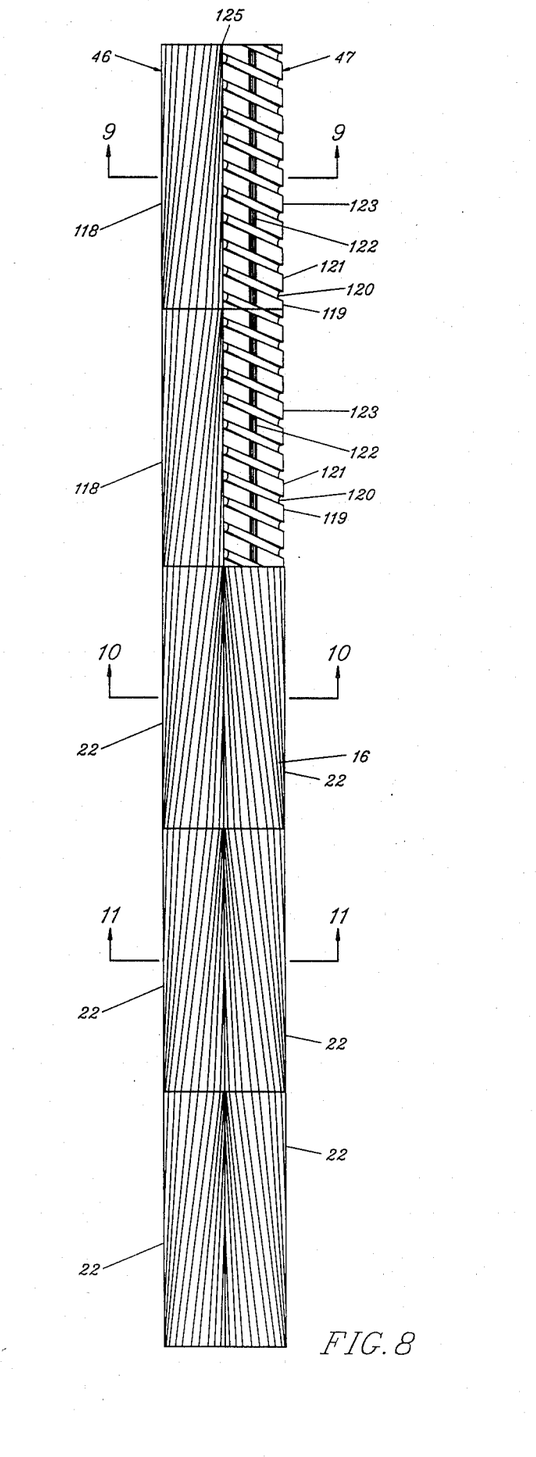
FIG. 8 is a top plan view of two typical cooperating counter-rotating husking roll assemblies, the left roll assembly having three husking roll sections in accordance with the present invention, and the right roll assembly having three husking roll sections in accordance with the present invention.
Figure 9:
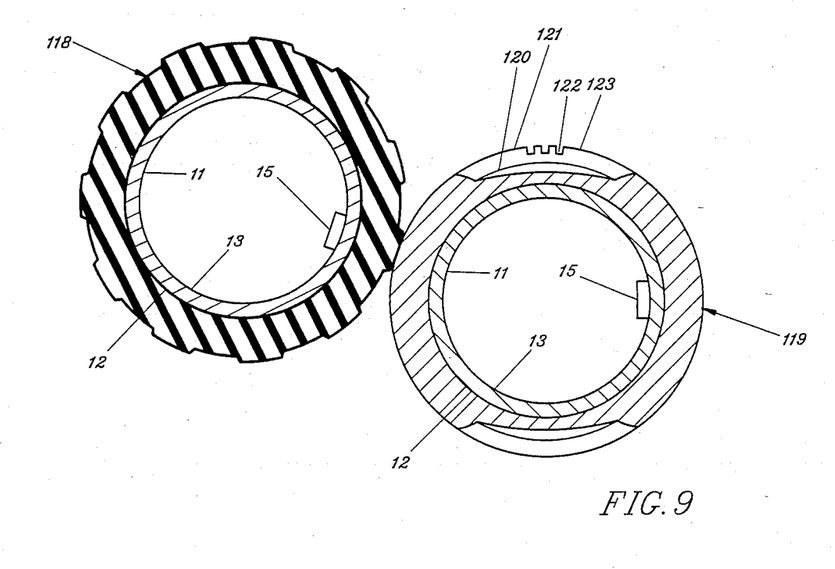
FIG. 9 is a section view taken along section line 9—9 of FIG. 8.
Figure 10:
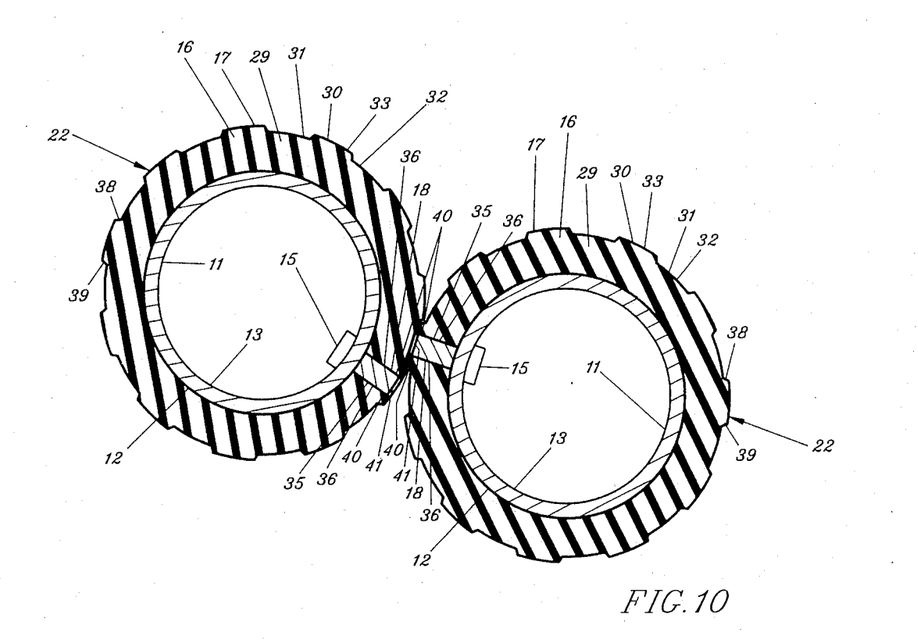
FIG. 10 is a section view taken along section line 10—10 of FIG. 8.
Figure 11:
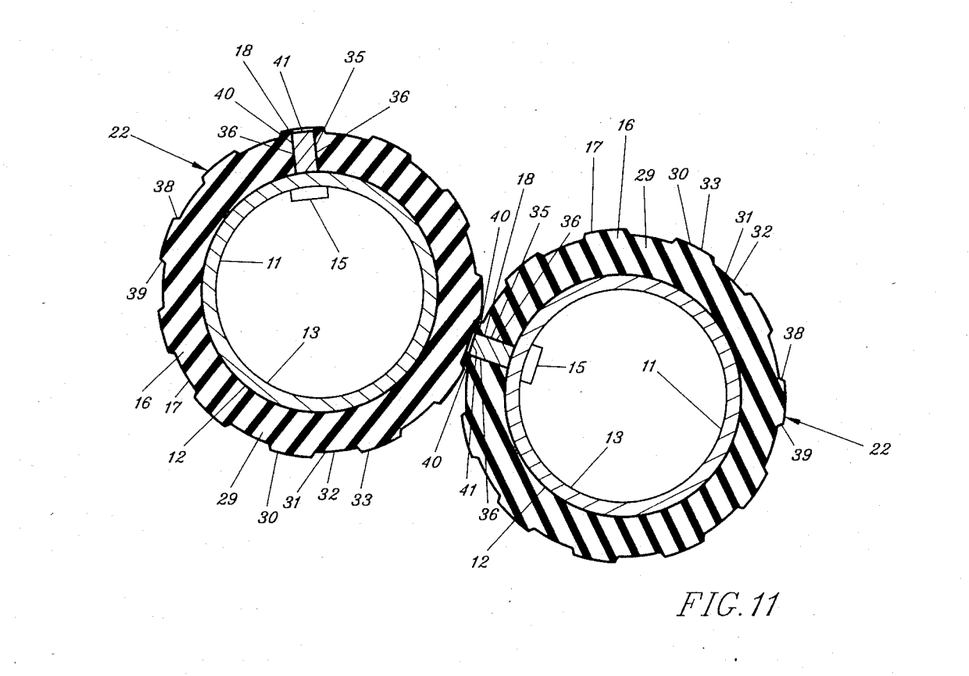
FIG. 11 is a section view taken along section line 11—11 of FIG. 8.

FIG. 8 shows two cooperating counter-rotating roll assemblies 46 and 47, which are a typical combination of roll sections which would actually be used to husk seed corn at a station. FIGS. 9-11 are cross-sectional views of three pairs of cooperating counter-rotating husking roll sections which are included in the two roll assemblies 46 and 47 of FIG. 8. The left-most, low-profile husking roll section 118 shown in FIG. 9 is similar to the other low-profile husking roll sections 20 and 22 shown in FIGS. 3-4, except that the roll section 118 includes no hardened sector. Since the husking roll section 118 does not include a hardened sector, it is not intended to be part of the present invention described herein. The right-most non-intermeshing spiral husking roll section 119 shown in FIGS. 8-9 is quite similar to the spiral roll section 21 shown in FIGS. 3-4, with two differences. First of all, the spiral husking roll section 119 is formed from aluminum instead of hardened rubber. Secondly, the spiral 119 has no bridge portions extending across its grooves 120 between adjacent lands 121. Instead, each land 121 has three slots 122, which run in an axial direction across the top surface 123 of the lands 121 as shown in FIGS. 8-9. These slots 122 aid in gripping and driving stalks between the rolls to separate them from the ears. The spiral husking roll section 119 is not intended to be part of the present invention described herein.

The four husking roll sections 22 shown in FIGS. 10-11 are all substantially identical low-profile sections 22 each having one steel rib 35 which is radially aligned with a land 30 and extends the entire length of the particular roll section in a parallel relationship to the parallel helical lands 30 and grooves 31 of the husking surface 17 as shown in the husking roll section 22 o FIGS. 1 and 4. Note that the sections 22 are able to intermesh despite the presence of the hardened sectors.

Although all of the husking roll sections 20, 22, 23, 24, 25, and 26, which are embodiments of the present invention, are shown in FIGS. 1-8 and 10-11 to have husking surfaces which define eleven lands and eleven grooves which each advance two-elevenths of a turn throughout the entire length of the roll sections, husking sections could have a different number of lands and grooves which have a helical advance rate of less than one 360° turn for each nominal twelve inch roll section and still be considered within the present invention. Furthermore, although in all embodiments of the present invention shown, the hardened sectors are helical and extend the entire length of the roll section in parallel relationship to the lands and grooves, a husking roll section could have hardened sectors which extend only part of the length of a roll section.

Figures 12, 13, 14:
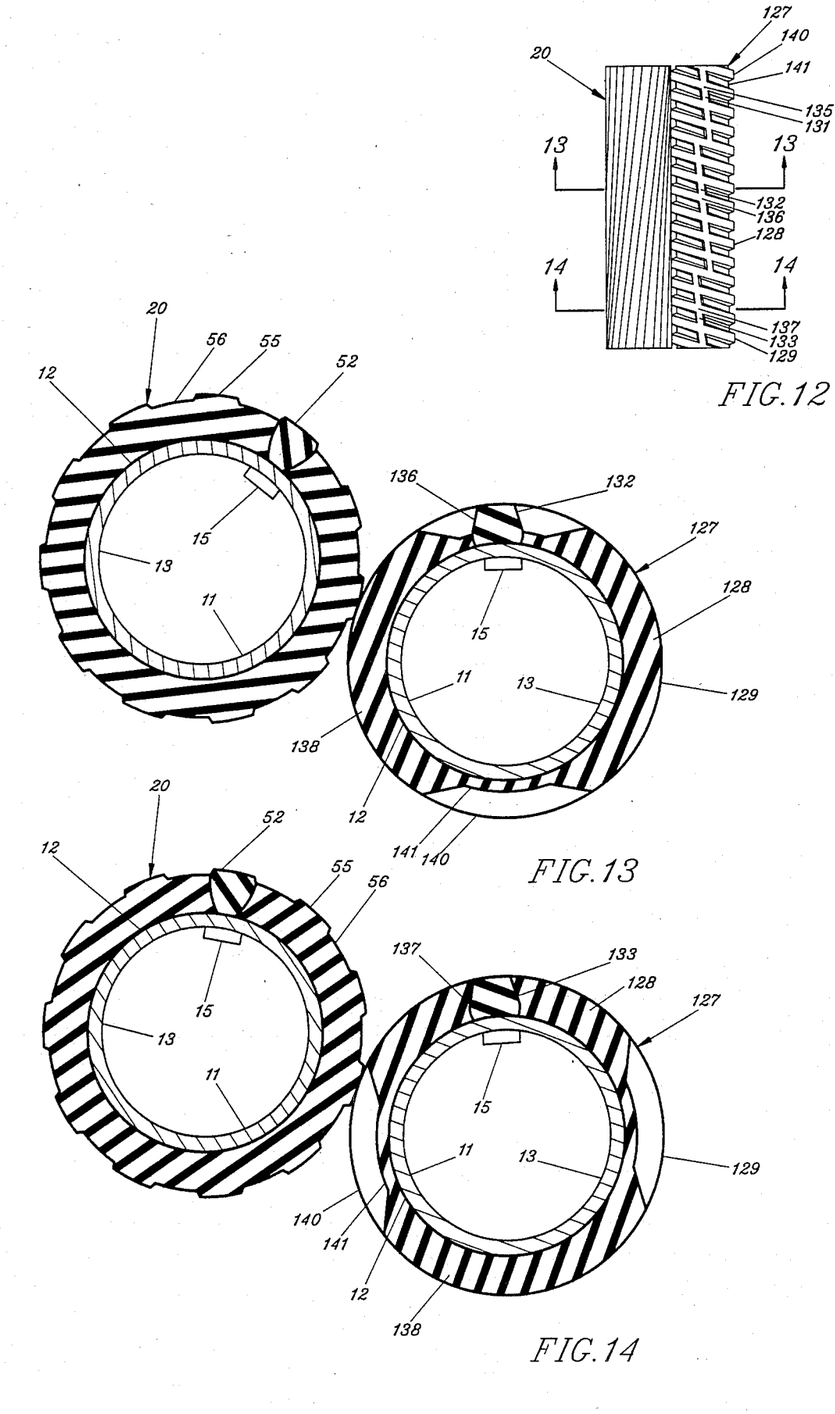
FIG. 12 is a plan view of a husking roll section in accordance with the invention having hardened rubber ribs which extend across grooves and through lands of the double helical resilient major portion.
FIG. 13 is a section view taken along section line 13—13 of FIG. 12.
FIG. 14 is a section view taken along section line 14—14 of FIG. 12.

For example, FIGS. 12-14 show a non-intermeshing type husking roll section 127 which includes a husking sleeve 128 which is affixed to and surrounds the outside surface 12 of the core 11 to form a spiraled husking surface 129. The sleeve 128 includes three hardened sectors 131, 132 and 133 which each are formed from hardened rubber ribs 135, 136 and 137, and a resilient major portion 138 which is formed from an elastic material which is bonded both to the hardened sectors 131, 132 and 133 and to the core 11. The rubber ribs 135, 136 and 137 are each bonded to the core 11. The sleeve 128 has parallel lands 140 and grooves 141 in the form of two helicies which each advance seven and one half turns for the nominal twelve inch length of the section 127. Each hardened rubber sector 131, 132 or 133 extends across grooves 141 and through lands 140, and therefore is not parallel to the lands 140 or grooves 141. However, each hardened sector 131, 132 or 133 is helical in shape and advances at a rate of two-elevenths of a turn for the nominal twelve inch length. The hardened sectors 131, 132 and 133 therefore have the same pitch as the lands 55, 30, 76, 89, 100 and 112 of the intermeshing type of husking roll sections 20 and 22-26 shown in FIGS. 1-11. The roll section 127 could be placed on a roll assembly so that its hardened sectors 131, 132 and 133 would each along their entire length directly abut and press against a land, or at least come adjacent to a land on the intermeshing type of roll section shown in FIGS. 1-11. Although the roll section 127 has lands 140 and grooves 141 which each advance seven and one-half turns throughout the nominal twelve inch length, the advance rate could vary as long as the lands and grooves each advance a plurality of turns for the nominal twelve inch length. Additionally, the hardened sectors 131, 132 and 133 could also each advance at a different rate which is less than one turn for each nominal twelve inch roll section. The hardened rubber ribs 135, 136 and 137 as shown are affixed to the core 11. Alternatively they might be affixed only to the resilient major portion 138. In such an embodiment, some of the elastic material forming the resilient major portion 138 might extend between the core 11 and ribs 135, 136 and 137.

The section 127 could even be entrained on a shaft so that one of its hardened sectors 132 directly abuts and presses against the hardened sector 52, as will be the case on rotation of the sections 20 and 127 in FIG. 13. This type of section 127 would be less aggressive in husking than the other described embodiments because the pitch of its helicies is like those of the non-resilient roll sections 21 and 119. Since it is resilient, though, it will husk more aggressively than the non-resilient sections 21 and 119. With the hardened sectors 131, 132 and 133, roll section 127 will be effective at stalk separation. Like the other embodiments, its hardened sectors 131, 132 and 133 have no hard, sharp edges or corners which might damage the produce.

The present invention is not intended to be limited to the embodiments shown in the figures. For example, a low-profile husking roll section could have two or more hardened sectors formed from hardened rubber or by embedded steel ribs. The embodiments shown also are all nominal twelve inch sections. Alternatively, they could be nominal six inch long sections, or some other length and still be considered to be within the parameters of the present invention.

The elastic material which is used to form the resilient major portions 29, 53, 74, 87, 111, and 138 shown in all of the figures preferably has a hardness according to the Shore hardness scale of A85 to A95 and is preferably formed from heat treated natural rubber having a sulfur content of about 3%. This elastic material compound must meet the requirements of 21 CFR Section 177.2600 "Rubber articles intended for repeated use" (1986), as does Waukesha Rubber Company Compound No. 3167.

All of the rubber hardened sectors 52, 97, 108, and 131, 132 and 133 which are shown in husking roll sections 20, 25, 26 and 127 in all of the figures preferably have a hardness of from D55 to D75 on the Shore hardness scale and preferably are formed of heat treated natural rubber having a 20% to 35% sulfur content. It has been found that hard rubber hardened sectors of hardness greater than Shore D75 tend to be too brittle for use in separating and ejecting stalks. Rubber hardened sectors which are softer than Shore D55 tend to be too ineffective at ejecting the stalks.

Roll sections 20, and 22-26 are formed using molds which are shaped to form the high-profile or low-profile husking sleeves. If steel is used to form the hardened sector such as in roll sections 22-24, the helical steel rib is welded to the core 11 and the core 11 is then placed in the mold so the steel rib coincides with a land or groove in the husking sleeve. The elastic rubber material, when added and heat-treated, then bonds to the steel rib and core 11.

Although the same type of molds used to make rolls with steel ribs are used to make roll sections such as 20, 25 and 26 which have hardened rubber ribs, a different procedure is used. The high sulfur rubber for forming a hardened rib is fashioned into a long rope-like shape and then placed into the mold where the rope will form a land or a groove, as desired. It may be placed so that it will come into contact with and bond to the core 11 or so that it will bond only to the elastic material forming the resilient major portion. The elastic rubber material which forms the resilient major portion will bond to the core 11 when heat treated. The sulfur which is to be used in both the resilient major portion and the hardened rubber rib should be formed of sulfur molecules $S_n$, where n is greater than 1, "n" being the number of sulfur atoms in the sulfur molecule. The heat will cause the sulfur which is in the resilient major portion to bond to the rubber in the resilient major portion, and also to the sulfur in the hardened rubber rib. The sulfur in the hardened rubber rib will bond to the rubber in the hardened rubber rib and to the sulfur in the resilient major portion. The hardened rubber rib and resilient major portion will therefore be bonded together through their sulfur.

The procedure used for making the roll section 127 of FIGS. 12-14 is essentially the same procedure used in making the roll sections 20, 25 and 26 which have hard rubber hardened sectors. A different mold, however, is required.

In the low-profile husking roll sections 20 and 22 as shown in FIGS. 1, 3-4, and 10-11, the distance from a bottom of the grooves 56 and 31 to a top of the lands 55 and 30 is less than 0.075 inches, it having been found that lands with heights less than 0.075 inches are particularly advantageous for use in husking seed corn. When the height of the lands is equal to or greater than 0.075 inches, the roll section is more aggressive than desired for efficient husking of seed corn because it causes too much shelling of kernels. In high-profile husking roll sections 23, 24, 25, and 26, such as are shown in FIGS. 5-7, the distance from a bottom of the grooves 77, 101, 90, and 113 to a top of the lands 76, 100, 89, and 112 is 0.075 inches and greater. Again, it has been found for this intermeshing type of section, that when the lands are high profile, the husking roll sections are particularly effective at husking sweet corn, destemming oranges, and stripping off the exterior extraneous matter from other types of produce which require quite aggressive stripping. The roll section 127 shown in FIGS. 12-14, however, may have lands with heights greater than 0.075 inches, and still be used with seed corn, because of the gentle spiraling.

In their use, the husking roll sections 20, 22-26 and 127 of FIGS. 2-7 and 12-14 are intended to be placed on two counter-rotating shafts of a husking machine so that the keys 15 fit into the keyways of the shafts, thereby forming two cooperating counter-rotating husking roll assemblies as shown at 43 and 44 of FIG. 2 and 46 and 47 of FIG. 8. We have found it advantageous to place non-resilient spiraled roll sections, such as are shown at 21 and 119 of FIGS. 2 and 8, on the lower cooperating counter-rotating roll assembly 44 or 47 near the feed end 49 or 125 thereof, to give these relatively non-aggressive roll sections the first chance to husk the corn. These non-resilient roll sections 21 and 119, being less aggressive than the resilient roll sections 20, 22-26, and 118, cause less shelling of the individual kernels of corn from the cobs. Once the husking has begun and some of the husks have been removed, the cooperating resilient roll sections then will remove the remaining husks aggressively, without treating the husked ears roughly.

As already demonstrated, husking roll sections may be placed on the counter-rotating shafts in many different combinations. As shown in FIG. 5, a husking roll section 23 having one hardened sector 75 can be mated against a roll section 24 having two hardened sectors 75 and 86. The same is demonstrated in FIG. 6, except that the hardened sectors 97 and 108 are formed entirely with hardened rubber ribs 99 and 107. FIG. 7 shows two sets of different types of hardened sectors which can be located to directly abut and press against one another as the roll sections, 24 and 26, counter-rotate. The hardened sector 75 which includes steel on roll section 24 presses against the hardened sector 108 of the roll section 26, and the rubber hardened sector 86 which includes steel of the roll section 24 will press up against the rubber hardened sector 97 of the roll section 26 on 180° counter-rotation of the sections 24 and 26. As shown in FIG. 11, the roll sections 22 may be placed on the husking machine shafts so that the hardened sectors 18 are randomly located. FIG. 10 shows two hardened sectors 18 in lands 30 which mesh adjacently to one another. Generally, stalk separation and ejection will be more aggressive as the number of hardened sectors in two counter-rotating roll sections increases. The roll sections will be particularly aggressive at separating and ejecting stalks when the hardened sectors directly abut and press against one another as shown in FIGS. 6 and 7 or mesh adjacently together as shown in FIG. 10. The leading edges 60, 38, 79, and 105 of the hardened sectors 52, 18, 75, and 97 which are radially aligned with or form lands will become worn with use. When these leading edges become worn, it is recommended that the roll sections be turned end for end and placed back on the shaft so that the former trailing edges 61, 39, 80, and 106 become the new leading edges.

FIG. 8 shows two cooperating counter-rotating roll assemblies 46 and 47 having a combination of roll sections 118, 119, and 22, which might be effectively used to husk seed corn. As noted before, the lower right roll assembly 47 has two aluminum spirals 119 near the feed end 125 of the assemblies 46 and 47 to reduce shelling. These aluminum sections 119 rotate against rubber roll sections 118, which do not have hardened sectors. It is inadvisable to place a husking roll section such as that shown at 22 of FIG. 4 or 23 and 24 of FIG. 5, having one or more hardened sectors formed in part with steel ribs, against an aluminum spiral section 119. As the elastic material which forms the husking sleeve wears away over the steel rib, the steel rib becomes exposed and can damage the aluminum spiral 119. However, a low-profile roll section 20 having a hardened sector 52 formed from hardened rubber could be placed against an aluminum spiral section 119, because the hardened rubber sector is less rigid than steel. A low-profile roll section 22 having a hardened sector 18 formed with a steel rib 85, nevertheless, could be placed against a hardened rubber spiral section as shown at 21 in FIG. 4, since the hardened rubber spiral is less likely to become marred than the aluminum spiral 119. Low-profile sections 20, 22, and 118 may be placed adjacent to non-resilient roll sections 21 and 119 or against other low-profile roll sections, or against high-profile sections such as those shown in FIGS. 5–7.

The embodiments of the present invention shown herein effectively pinch, pull and separate stalks from the ears of corn being husked and do not allow stalks to remain wedged between the rotating elastic husking surfaces of two cooperating husking sections. This stalk separation is accomplished without any exposed sharp edges or corners which might damage the kernels. When intermeshing type roll sections include hardened sectors according to the present invention, the hardened sectors will separate stalks without interfering with the ability of the roll sections to mesh with other intermeshing sections. A minimum of shelling occurs with the correct use, as described above, of the husking roll sections according to the present invention. Proper utilization of the low-profile husking roll sections or the resilient spiral section 127 in accord with the present invention when husking seed corn will result in minimizing damage to the individual seed kernels and maximizing the probability of germination.

It is to be understood that the present invention is not limited to the particular arrangements and embodiments of parts disclosed and illustrated herein, nor to the materials specified, but embraces all such modified forms thereof as come within the scope of the following claims.

What is claimed is:

1. A husking roll section for use in combination with a second parallel husking roll section within a husking machine, comprising:
   (a) a cylindrical core including an outside surface; and
   (b) a husking sleeve affixed to and surrounding the outside surface of the core to form a husking surface, the sleeve including at least one hardened sector comprising a helical rigid rib affixed to the outside surface of the core, the sleeve further including a resilient major portion which is formed from an elastic material and which is bonded to the rigid rib and core, the husking sleeve presenting a plurality of helical lands and grooves which will mesh with reverse oriented helical grooves and lands of the second parallel husking roll when the two meshing husking rolls are rotated in opposite directions.

2. The husking roll section specified in claim 1 wherein the rigid rib is a metal rib which is affixed to the core outside surface, and the elastic material which forms the resilient major portion is bonded to the rigid metal rib sides and to the core outside surface so that the rigid rib sides are completely covered by the elastic material, the metal rib and the elastic material immediately adjacent thereto forming the hardened sector.

3. The husking roll section specified in claim 1 wherein the hardened sector is formed entirely from hardened rubber which is bonded to the core outside surface.

4. The husking roll section specified in claim 3 wherein the husking surface defines lands and grooves therebetween which each advance helically less than one 360° turn for each nominal twelve inch length of roll section.

5. The husking roll section specified in claim 3 wherein the radial distance from a bottom of each groove to the tops of the adjacent lands is less than 0.075 inches.

6. The husking roll section specified in claim 3 wherein the hardened sector is radially aligned with a groove.

7. The husking roll section specified in claim 6 wherein the hardened sector includes a top which forms at least a portion of a bottom surface of a groove.

8. The husking roll section specified in claim 3 wherein the hardened sector is radially aligned with a land.

9. The husking roll section specified in claim 8 wherein the hardened sector includes a crown portion which forms a land on the husking surface.

10. The husking roll section specified in claim 9 wherein the crown portion has sloped edges.

11. A husking roll section for use in combination with a second parallel husking roll section within a machine for husking produce, the section comprising:
    (a) a cylindrical core including an outside surface; and
    (b) a husking sleeve affixed to and surrounding the outside surface of the core to form a husking surface with parallel helical lands and grooves which will mesh with similar grooves and lands to reverse orientation on the second husking roll when the two husking rolls are rotated in opposite directions, the sleeve including at least one rigid helical metal rib which has two sides and which is affixed to the core outside surface so as to be parallel with the lands and grooves, and a resilient major portion formed from an elastic material which is bonded to the rigid rib sides and to the core outside surface so that the rigid rib sides are completely covered by the elastic material, the metal rib and the elastic material immediately adjacent thereto forming a hardened sector for engaging a produce stalk between the parallel meshing husking roll sections without substantial deformation of the hardened sector to force the stalk to pass between the roll sections and be ejected thereby.

12. The husking roll section specified in claim 11 wherein the helical lands and grooves, and the hardened sector extend substantially the entire length of the roll section.

13. The husking roll section specified in claim 11 wherein the husking surface defines lands and grooves therebetween which each advance helically less than one 360° turn for each nominal twelve inch length of roll section.

14. The husking roll section specified in claim 11 wherein the radial distance from a bottom of each groove to the tops of the adjacent lands is less than 0.075 inches.

15. The husking roll section specified in claim 11 wherein the resilient major portion of the husking sleeve also overlies a top of the metal rib.

16. The husking roll section specified in claim 11 wherein the hardened sector is radially aligned with a groove.

17. The husking roll section specified in claim 11 wherein the metal rib is welded to the core outside surface.

18. The husking roll section specified in claim 11 wherein the metal rib is radially aligned with a land.

19. The husking roll section specified in claim 18 wherein the land has sloped edges which form buffer strips which entirely cover the upper portions of the two sides of each metal rib.

* * * * *